(12) United States Patent
Kraenzel

(10) Patent No.: US 7,844,965 B2
(45) Date of Patent: Nov. 30, 2010

(54) PROVIDING USER APPLICATIONS FOR ACCESSING DATA ON MULTIPLE PLATFORMS FROM A REMOVABLE STORAGE MEDIUM

(75) Inventor: Carl J. Kraenzel, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1459 days.

(21) Appl. No.: 10/733,513

(22) Filed: Dec. 11, 2003

(65) Prior Publication Data

US 2005/0132369 A1 Jun. 16, 2005

(51) Int. Cl.
G06F 9/46 (2006.01)
G06F 9/00 (2006.01)
G06F 1/24 (2006.01)
G06F 13/00 (2006.01)

(52) U.S. Cl. ............... 718/100; 713/1; 713/100; 711/115

(58) Field of Classification Search ............ 718/100, 718/104; 710/13; 711/4, 115; 700/5; 707/1, 707/100, 200, 203; 709/227; 713/1, 100
See application file for complete search history.

(56) References Cited

U.S. PATENT DOCUMENTS

| | | | | |
|---|---|---|---|---|
| 5,617,560 A * | 4/1997 | Ichikawa | ............... | 710/62 |
| 5,636,357 A * | 6/1997 | Weiner | ............... | 711/115 |
| 6,289,391 B1 * | 9/2001 | Smith et al. | ............... | 719/312 |
| 6,317,797 B2 * | 11/2001 | Clark et al. | ............... | 710/5 |
| 6,915,312 B2 * | 7/2005 | Bodnar et al. | ............... | 707/203 |
| 7,010,651 B2 * | 3/2006 | McGuffin | ............... | 711/156 |
| 7,039,656 B1 * | 5/2006 | Tsai et al. | ............... | 707/201 |
| 7,441,108 B2 * | 10/2008 | Fisher et al. | ............... | 712/227 |
| 2003/0104833 A1 * | 6/2003 | Chiu | ............... | 455/556 |
| 2003/0110371 A1 * | 6/2003 | Yang et al. | ............... | 713/100 |
| 2003/0220876 A1 * | 11/2003 | Burger et al. | ............... | 705/50 |
| 2005/0037647 A1 * | 2/2005 | Le | ............... | 439/131 |
| 2005/0125621 A1 * | 6/2005 | Shah | ............... | 711/173 |
| 2006/0168395 A1 * | 7/2006 | Deng et al. | ............... | 711/113 |

OTHER PUBLICATIONS

Silberschatz, Abraham, et al., "Operating System Concepts", 1999, John Wiley & Sons, Inc., Fifth Edition, pp. 745-746 and 764-765.*

* cited by examiner

*Primary Examiner*—Lewis A Bullock, Jr.
*Assistant Examiner*—Kenneth Tang
(74) *Attorney, Agent, or Firm*—Daniel McLoughlin; Hoffman Warnick LLC

(57) ABSTRACT

Under the present invention, a computer program is provided/developed to include a first set of program code that is executable on a first operating system (e.g., a WIN32-based operating system) and a second set of program code that is executable on a second operating system (e.g., handheld device-based operating system). Both sets of program code are set to read/write from a common datastore. Thereafter, the sets of program code and the common datastore can be stored on a removable storage medium such as a SD-RAM card with a USB adapter for easy interface with "full" computer systems and handheld devices.

19 Claims, 2 Drawing Sheets

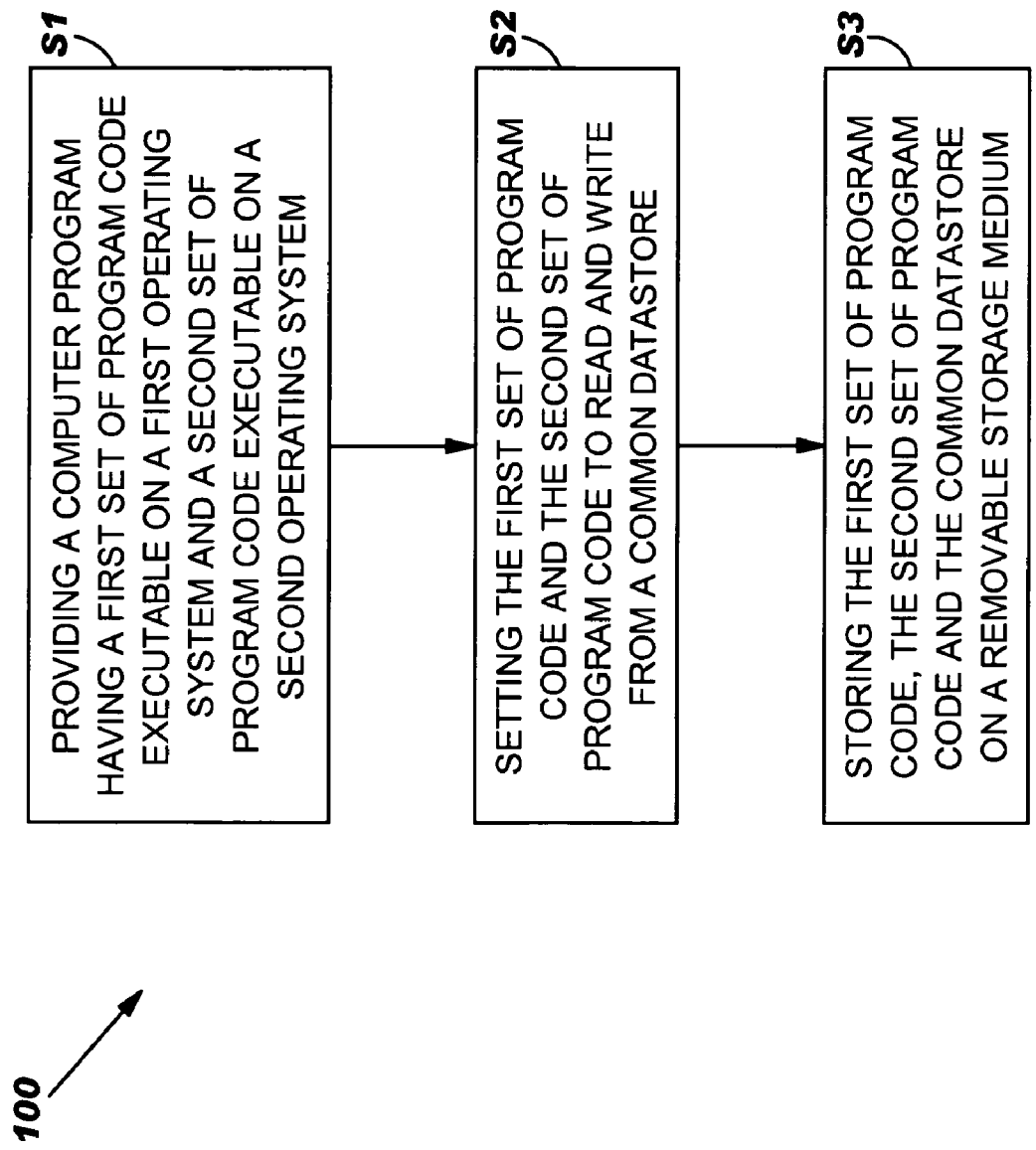

PROVIDING USER APPLICATIONS FOR ACCESSING DATA ON MULTIPLE PLATFORMS FROM A REMOVABLE STORAGE MEDIUM

BACKGROUND OF THE INVENTION

1. Field of the Invention

The present invention generally relates to a universal user roaming method, system and program product. Specifically, the present invention provides improved application roaming between desktop and handheld environments.

2. Related Art

In recent years, vast improvements have been made to handheld devices such as personal digital assistants, cellular telephones, etc. These devices have provided users with greater mobility. To this extent, as the use of handheld devices becomes more pervasive, users are increasingly seeking to migrate/roam between "full" computer systems (e.g., desktops, laptops, etc.) and handheld devices. Unfortunately, today the handheld device "model" is somewhat hampered. For example, today a user will typically synchronize information onto a handheld device from a host desktop or laptop. Once synchronized, however, the information on the handheld device is presented with different program executables, and has smaller screens and keyboards. If the user decides to travel, he/she may ultimately have to bring or attempt to access a "full" computer system in order to comfortably switch back to full scale integration mode of an application against underlying data. For example, in the case of MICROSOFT OUTLOOK, although a user might be able to author an electronic mail message on his/her handheld device, the user will likely have to access a "full" computer system to perform any other more advanced functions. Thus, the handheld device does not really complete the roaming user need, since access to a "full" computer system may still be needed. Even if a "full" computer system is available, it might not be the user's own system. For the example, the "full" computer system accessed could be configured for a different user. As such, the user could still be required to travel with his/her own laptop to provide the needed functionality.

Other user-roaming models such as airport kiosks are hampered by the need to use web browsers to convey the application experience. This presents multiple problems, especially concern over whether the cache of the browser is completely cleared after each use. To this extent, unless the user can bring or access a full computer system such as a laptop, a complete desktop (e.g., a WIN32 desktop) is simply not available. Moreover, any involvement of a handheld device under this current state of the art only adds the complication of requiring the user to synchronize the handheld's data state with the full desktop application.

In view of the foregoing, there exists a need for a universal user roaming method, system and program product. Specifically, a need exists for a computer program to be developed that includes one set of program code executable on a first operating system (e.g., a WIN32-based operating system) and another set of program code executable on a second operating system (e.g., handheld device-based operating system). A further need exists for both sets of program code to read/write from a common datastore. Still yet, a need exists for the sets of program code and the common datastore to be stored on a removable storage medium such as a SD-RAM card with a USB adapter for easy interface with "full" computer systems and handheld devices without requiring synchronization.

SUMMARY OF THE INVENTION

In general, the present invention provides a universal user roaming method, system and program product. Specifically, under the present invention, a computer program is provided/developed to include a first set of program code that is executable on a first operating system (e.g., a WIN32-based operating system) and a second set of program code that is executable on a second operating system (e.g., handheld device-based operating system). Both sets of program code are set to read/write from a common datastore. Thereafter, the sets of program code and the common datastore can be stored on a removable storage medium such as an SD-RAM card with a USB adapter for easy interface with "full" computer systems and handheld devices. This provides user mobility without the need for synchronization. Specifically, a user can now have needed mobility without having to carry a laptop or other more portable "full" computer systems. Traditionally, users carried the laptops while mobile so that they could interact with data while in transit, and then have the ability to go into a full-work mode when reaching their destination. Under the present invention, these advantages are provided without having to carry the laptop while in transit.

A first aspect of the present invention provides a universal user roaming method, comprising: providing a computer program having a first set of program code executable on a first operating system and a second set of program code executable on a second operating system; setting the first set of program code and the second set of program code to read and write from a common datastore; and storing the first set of program code, the second set of program code and the common datastore on a removable storage medium.

A second aspect of the present invention provides a universal user roaming method, comprising: providing a computer program having a first set of program code executable on a WIN32-based operating system and a second set of program code executable on a handheld device-based operating system; setting the first set of program code and the second set of program code to read and write from a common datastore; and storing the first set of program code, the second set of program code and the common datastore on a removable storage medium.

A third aspect of the present invention provides a universal user roaming system, comprising: a code development system for providing a computer program having a first set of program code executable on a first operating system and a second set of program code executable on a second operating system; a storage setting system for setting the first set of program code and the second set of program code to read and write from a common datastore; and an export system for storing the first set of program code, the second set of program code and the common datastore on a removable storage medium.

A fourth aspect of the present invention provides a universal user roaming program product stored on a recordable medium, which when executed, comprises: means for providing a computer program having a first set of program code executable on a first operating system and a second set of program code executable on a second operating system; means for setting the first set of program code and the second set of program code to read and write from a common datastore; and means for storing the first set of program code, the second set of program code and the common datastore on a removable storage medium.

Therefore, the present invention provides a universal user roaming method, system and program product.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a method flow diagram according to the present invention.

Figure 1:
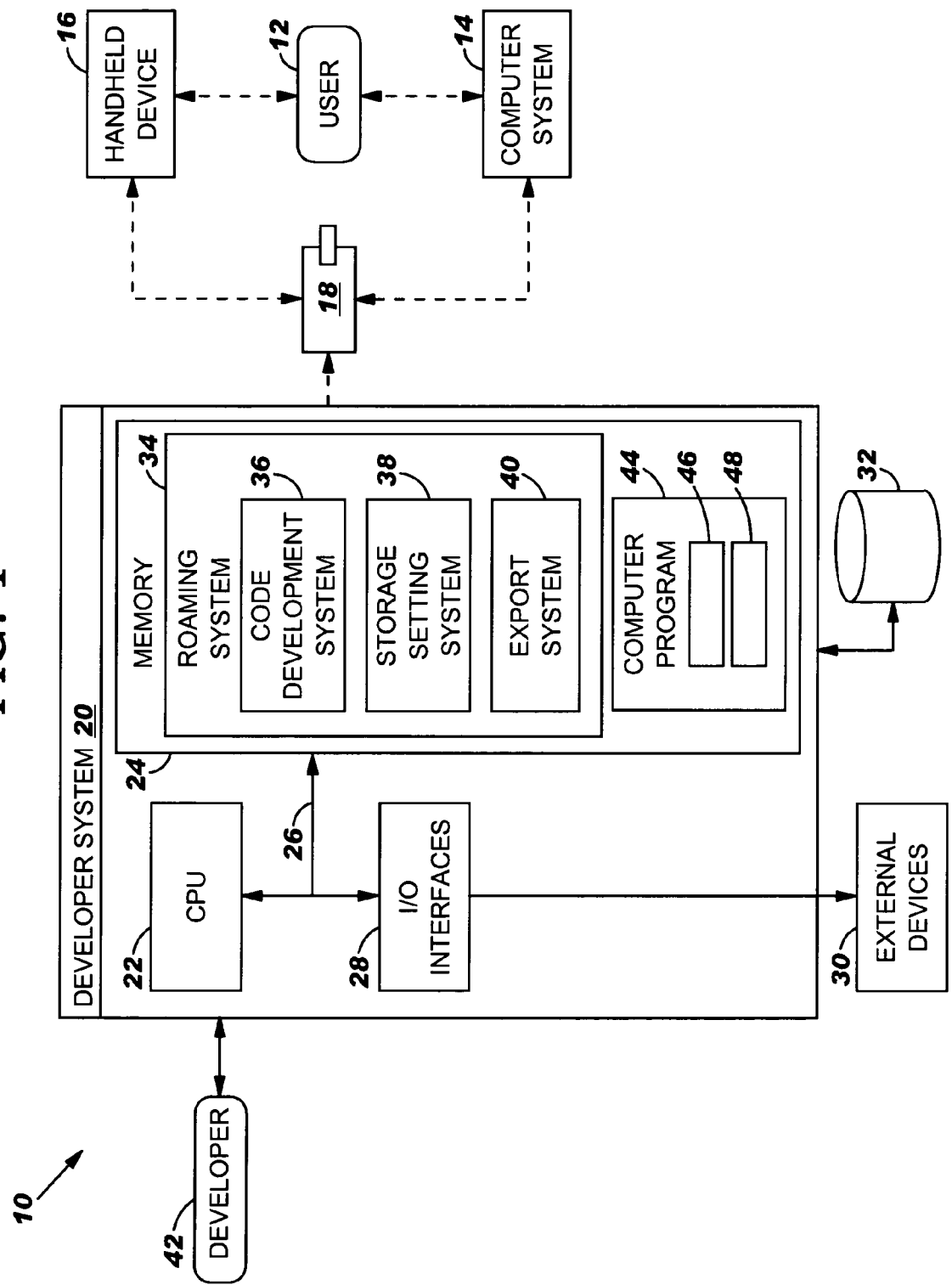
FIG. 1 depicts an illustrative universal user roaming system according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a universal user roaming method, system and program product. Specifically, under the present invention, a computer program is provided/developed to include a first set of program code that is executable on a first operating system (e.g., a WIN32-based operating system) and a second set of program code that is executable on a second operating system (e.g., hand-held device-based operating system). Both sets of program code are set to read/write from a common datastore. Thereafter, the sets of program code and the common datastore can be stored on a removable storage medium such as an SD-RAM card with a USB adapter for easy interface with "full" computer systems and handheld devices. This provides user mobility without the need for synchronization. Specifically, a user can now have needed mobility without having to carry a laptop or other more portable "full" computer systems. Traditionally, users carried the laptops while mobile so that they could interact with data while in transit, and then have the ability to go into a full-work mode when reaching their destination. Under the present invention, these advantages are provided without having to carry the laptop while in transit.

Referring now to FIG. 1 a universal user roaming system 10 according to the present invention is shown. Specifically, the present invention, user 12 can roam more freely between computer systems having different operating systems. For example, under the teachings of the present invention, user 12 will be able to more easily roam between a full computer system 14 (e.g., desktop, laptop, kiosk etc.) and a handheld device 16 (e.g., personal digital assistant, etc.). To provide such roaming capabilities, any computer program(s) that user wishes to roam between different types of systems/devices will be developed to be operating system specific for the multiple operating systems thereof. For example, assume computer program 44 is an application such as LOTUS NOTES. In this case, computer program 44 will be developed to include a first set of program code 46 that is executable on a first operating system such as a WIN 32-based operating system (e.g., WINDOWS 2000, WINDOWS ME, WINDOWS XP, etc.), and a second set of program code 48 that is executable on a second operating system such as a hand-held device-based operating system (e.g., POCKETPC). Both sets of program code 46 and 48 would be set to read and/or write from the same or common datastore. Once this was provided, computer program 44 (including both sets of program code) and the common datastore would be stored on a removable storage medium 18 that is capable of interfacing with computer system 14 and/or handheld device 16. It should be understood, however, that the present invention is not limited to roaming between a full computer system and a handheld device. Rather, the present invention could be used to migrate between two full computer systems such as a Windows-based system and a Linux-based system.

Regardless, as shown, system 10 includes developer system 20, which is intended to represent any type of computerized device on which developer 42 can develop or otherwise provide (e.g., upload) computer program 44 in accordance with the present invention. For example, developer system 20 could be a desktop, a workstation, a laptop, etc. In any event, developer system 20 generally comprises central processing unit (CPU) 22, memory 24, bus 26, input/output (I/O) interfaces 28, external devices/resources 30 and storage unit 32. CPU 22 may comprise a single processing unit, or be distributed across one or more processing units in one or more locations, e.g., on a client and server. Memory 24 may comprise any known type of data storage and/or transmission media, including magnetic media, optical media, random access memory (RAM), read-only memory (ROM), a data cache, etc. Moreover, similar to CPU 22, memory 24 may reside at a single physical location, comprising one or more types of data storage, or be distributed across a plurality of physical systems in various forms. I/O interfaces 28 may comprise any system for exchanging information to/from an external source. External devices/resources 30 may comprise any known type of external device, including speakers, a CRT, LCD screen, hand held device, keyboard, mouse, voice recognition system, speech output system, printer, monitor/display, facsimile, pager, etc. Bus 26 provides a communication link between each of the components in developer system 20 and likewise may comprise any known type of transmission link, including electrical, optical, wireless, etc.

Storage unit 32 can be any system (e.g., database) capable of providing storage for information under the present invention. As such, storage unit 32 could include one or more storage devices, such as a magnetic disk drive or an optical disk drive. In another embodiment, storage unit 32 includes data distributed across, for example, a local area network (LAN), wide area network (WAN) or a storage area network (SAN) (not shown). Although not shown, additional components, such as cache memory, communication systems, system software, etc., may be incorporated into developer system 20. In addition, it should also be appreciated that although not shown, computer system 14 and handheld device 16 would likely include computerized components similar to developer system 20. Such components have not been shown for brevity purposes.

Shown in memory 24 of developer system 20 is roaming system 34 (shown as a program product), which includes code development system 36, storage setting system 38 and export system 40. Under the present invention, developer 42 will use code development system 36 to develop/provide computer program 44 that is operating system specific for multiple different operating systems. To this extent, code development system 36 could include some or all of the components/capabilities of any known system for developing a computer program. In any event, as indicated above, computer program 44 will have first set of program code 46 that is executable on a first operating system (e.g., for computer system 14) and second set of program code 48 that is executable on a second operating system (e.g., for handheld device 16). In a typical embodiment, both sets of program code 46 and 48 will be stored in the same directory on developer system 20.

In any event, after both sets of program code 46 and 48 have been provided, storage setting system 38 will be used to set both sets of program code 46 and 48 to read/write from a common datastore (e.g., within storage unit 32). In a typical embodiment, the datastore is secured to provide security for the information contained therein. For example, access control to the datastore could be provided using encryption techniques, password protection, etc. In any event, once both sets of program code are set to read/write from the common datastore, export system 40 can be used to export/store computer program 44 and the datastore on removable storage medium 18. In addition, certain pieces of information corresponding to user 12 such as configuration settings, encryption keys, etc. are typically stored on removable storage medium 18. This is especially beneficial in WIN-32-based systems so that user 12 can have the same interaction on different systems. Furthermore, similar to storage on developer system 20, both sets of program code 46 and 48 are typically stored in a common directory on removable storage medium 18. Moreover, both sets of program code 46 and 48 should still be set to read/write from the common datastore. Removable storage medium 18 can be any type of "portable" or "moveable" device that is capable of interfacing with computer system 14 and handheld device 16 via standard interfaces. For example, in a typical embodiment, removable storage medium 18 can be an SD-RAM card that interfaces with computing devices via a USB adapter. In another embodiment, removable storage medium 18 can be a microdrive, a read-writeable compact disc, a ZIP drive, or any other type of portable storage medium. In any event, removable storage medium 18 provides a unique usage model, wherein user 12 does not have to synchronize data between two end-user machines (e.g., computer system 14 and handheld device 16) of same-or-different operating systems.

Once the storage process is complete, user 12 can use removable storage medium 18 on any system/device having the first operating system or the second operating system. For example, assume first set of program code 46 is executable on a WIN32-based operating system that is provided on computer system 14, while second set of program code 48 is executable on a handheld device-based operating system that is provided on handheld device 16. Based on this assumption, user 12 would be able to interface removable memory medium 18 with either system/device 14 or 16 and have access to the same data.

It should be understood that although shown has having two sets of program code 46 and 48, computer program 44 could be developed to accommodate any quantity of operating systems or environments. For example, computer program 44 could have N sets of program code to accommodate N operating systems. Further, although a WIN32-based operating system and a handheld device-based operating system were cited herein to describe the teachings of the present invention, it should be appreciated that these are only examples. For example, the present invention could be used to provide roaming with a Linux-based operating system (e.g., a Kiosk), a WIN16-based operating system (e.g., WINDOWS 3.1), etc. Still yet, the present invention could be implemented with any programming language such as WINDOWS C code, POCKETPC C, JAVA, etc.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 2, a method flow diagram 100 according to the present invention is shown. As depicted, first step S1 of the method is to provide a computer program having a first set of program code executable on a first operating system and a second set of program code executable on a second operating system. Second step S2 is to set the first set of program code and the second set of program code to read and write from a common datastore. Third step S3 is to store the first set of program code, the second set of program code and the common datastore on a removable storage medium.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A universal user roaming method, comprising:

providing a computer program having a first set of program code executable on a first WIN32-based operating system, the first set of program code being a full functioning version of a user application that is adapted for execution on the first WIN32-based operating system, and a second set of program code executable on a second non WIN32-based operating system for a handheld device, the second set of program code being a different limited functioning version of the user application that is adapted for execution on the first WIN32-based operating system;

setting the first set of program code and the second set of program code to read and write from a common datastore; and storing the first set of program code, the second set of program code and the common datastore on a removable storage medium that is accessible to only one of the operating systems at any one time, wherein the first set of program code and the second set of program code provide the operating systems functionality to execute the user application from the removable storage medium and perform operations on the common datastore.

2. The method of claim 1, wherein the first operating system is an operating system for a computer system selected from the group consisting of a desktop and a laptop.

3. The method of claim 1, wherein the removable storage medium is selected from the group consisting of a SD-RAM card, a microdrive, a ZIP drive and a read-writeable compact disc.

4. The method of claim 3, wherein the SD-RAM interfaces with a computer system via a USB adapter.

5. A universal user roaming method, comprising:
providing a computer program having a first set of program code executable on a WIN32-based operating system, the first set of program code being a full functioning version of a user application that is adapted for execution on the first WIN32-based operating system, and a second set of program code executable on a handheld device-based operating system, the second set of program code being a different limited functioning version of the user application that is adapted for execution on the first WIN32-based operating system;
setting the first set of program code and the second set of program code to read and write from a common datastore; and
storing the first set of program code, the second set of program code and the common datastore on a removable storage medium that is accessible to only one of the operating systems at any one time,
wherein the first set of program code and the second set of program code provide the operating systems functionality to execute the user application from the removable storage medium and perform operations on the common datastore.

6. The method of claim 5, wherein the WIN32-based operating system is for a computer system selected from the group consisting of a desktop and a laptop.

7. The method of claim 5, wherein the first set of program code and the second set of program code are provided within a common directory.

8. The method of claim 5, wherein the removable storage medium is selected from the group consisting of a SD-RAM card, a microdrive, a ZIP drive and a read-writeable compact disc.

9. The method of claim 8, wherein the SD-RAM card interfaces with a computer system via a USB adapter.

10. A universal user roaming system, comprising:
at least one computer device;
a code development system for providing a computer program having a first set of program code executable on a first operating system, the first set of program code being a full functioning version of a user application that is adapted for execution on the first WIN32-based operating system, and a second set of program code executable on a second non WIN32-based operating system for a handheld device, the second set of program code being a different limited functioning version of the user application that is adapted for execution on the first WIN32-based operating system;
a storage setting system for setting the first set of program code and the second set of program code to read and write from a common datastore; and
an export system for storing the first set of program code, the second set of program code and the common datastore on a removable storage medium,
wherein the first set of program code and the second set of program code provide the operating systems functionality to execute the user application from the removable storage medium and perform operations on the common datastore.

11. The system of claim 10, wherein the first operating system is an operating system for a computer system selected from the group consisting of a desktop and a laptop.

12. The system of claim 10, wherein the first set of program code and the second set of program code are provided within a common directory.

13. The system of claim 10, wherein the removable storage medium is selected from the group consisting of a SD-RAM card, a microdrive, a ZIP drive and a read-writeable compact disc.

14. The system of claim 13, wherein the SD-RAM card interfaces with a computer system via a USB adapter.

15. A universal user roaming program product stored on a computer readable storage medium, which when executed, comprises:
means for providing a computer program having a first set of program code executable on a first WIN-32 based operating system, the first set of program code being a full functioning version of a user application that is adapted for execution on the first WIN32-based operating system, and a second set of program code executable on a second non-WIN32-based operating system for a handheld device, the second set of program code being a different limited functioning version of the user application that is adapted for execution on the first WIN32-based operating system;
means for setting the first set of program code and the second set of program code to read and write from a common datastore; and
means for storing the first set of program code, the second set of program code and the common datastore on a removable storage medium,
wherein the first set of program code and the second set of program code provide the operating systems functionality to execute the user application from the removable storage medium and perform operations on the common datastore.

16. The program product of claim 15, wherein the first operating system is an operating system for a computer system selected from the group consisting of a desktop and a laptop.

17. The program product of claim 15, wherein the first set of program code and the second set of program code are provided within a common directory.

18. The program product of claim 15, wherein the removable storage medium is selected from the group consisting of a SD-RAM card, a microdrive, a ZIP drive and a read-writeable compact disc.

19. The program product of claim 15, wherein the SD-RAM card interfaces with a computer system via a USB adapter.

* * * * *